US 9,197,790 B2

(12) United States Patent
Chou et al.

(10) Patent No.: US 9,197,790 B2
(45) Date of Patent: *Nov. 24, 2015

(54) OPTICAL SCANNING PROJECTION MODULE

(71) Applicant: INDUSTRIAL TECHNOLOGY RESEARCH INSTITUTE, Hsinchu (TW)

(72) Inventors: Ming-Chieh Chou, Tainan (TW); Han-Wei Su, Tainan (TW); Yao-Hui Lee, Tainan (TW); Yu-Jen Wang, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 314 days.

This patent is subject to a terminal disclaimer.

(21) Appl. No.: 13/733,444

(22) Filed: Jan. 3, 2013

(65) Prior Publication Data

US 2013/0181109 A1 Jul. 18, 2013

(30) Foreign Application Priority Data

Jan. 13, 2012 (TW) .............................. 101101366 A
Oct. 24, 2012 (TW) .............................. 101139367 A

(51) Int. Cl.
*H04N 3/00* (2006.01)
*H04N 9/31* (2006.01)
(52) U.S. Cl.
CPC ................ *H04N 3/00* (2013.01); *H04N 9/317* (2013.01); *H04N 9/3129* (2013.01); *H04N 9/3194* (2013.01)
(58) Field of Classification Search
CPC ....... H04N 9/3129; H04N 3/00; H04N 9/317; H04N 9/3194
See application file for complete search history.

(56) References Cited

U.S. PATENT DOCUMENTS 7,306,339 B2 12/2007 Kaufman et al.
7,377,656 B2 5/2008 Nojima et al.
(Continued)

FOREIGN PATENT DOCUMENTS

CN 101263422 A 9/2008
CN 101561619 A 10/2009
(Continued)

OTHER PUBLICATIONS

Jongbaeg Kim et al., "Monolithic 2-D Scanning Mirror using Self-Aligned Angular Vertical Comb Drives", IEEE Photonics Technology Letters, vol. 17, No. 11, Nov. 2005, pp. 2307-2309.
(Continued)

*Primary Examiner* — Tony Ko
(74) *Attorney, Agent, or Firm* — Rabin & Berdo, P.C.

(57) ABSTRACT

An optical scanning projection module includes a scanning light component including a plurality of sub light sources and at least one light-splitting element, a main light reflective element, a scanning element and a photosensitive element. Sub light beams of the sub light sources are converged to form a main light beam. One of the sub light beams travels to the light-delivering element to form a partial reflective light beam and a partial penetrating light beam. With a scanning manner, the partial reflective light beam or the partial penetrating light beam is reflected by the scanning element to be an inspection light, and the main light beam is reflected by the scanning element to be a projection light. The photosensitive element outputs a sensing signal according to the inspection light. Thus, the optical scanning projection module controls the operation of the scanning light component according to the sensing signal.

30 Claims, 10 Drawing Sheets

(56) References Cited

U.S. PATENT DOCUMENTS

| | | | |
|---|---|---|---|
| 7,497,578 B2 | 3/2009 | Wood | |
| 7,508,496 B2 | 3/2009 | Mettenleiter et al. | |
| 7,550,713 B2 | 6/2009 | Gibson et al. | |
| 7,628,327 B2 | 12/2009 | Winkler et al. | |
| 7,956,858 B2 | 6/2011 | Sprague et al. | |
| 2005/0007562 A1 | 1/2005 | Seki et al. | |
| 2007/0291051 A1 | 12/2007 | Brown et al. | |
| 2008/0317077 A1 | 12/2008 | Hoving et al. | |
| 2009/0161705 A1 | 6/2009 | Almoric et al. | |
| 2009/0212203 A1 | 8/2009 | Gibson et al. | |
| 2010/0033691 A1 | 2/2010 | Hung et al. | |
| 2010/0053591 A1* | 3/2010 | Gibson et al. | 356/3.09 |
| 2010/0149073 A1 | 6/2010 | Chaum et al. | |
| 2010/0195058 A1* | 8/2010 | Ritz | 353/31 |
| 2011/0018986 A1 | 1/2011 | Sprague et al. | |
| 2011/0025930 A1 | 2/2011 | Sprague et al. | |
| 2011/0025983 A1 | 2/2011 | Sprague et al. | |

FOREIGN PATENT DOCUMENTS

| | | |
|---|---|---|
| CN | 102012614 A | 4/2011 |
| JP | 2010044204 A | 2/2010 |
| TW | I240090 B | 9/2005 |
| TW | 200832040 A | 8/2008 |
| TW | 201226973 A | 7/2012 |
| WO | WO-2009031094 A1 | 3/2009 |
| WO | WO-2011148498 A1 | 12/2011 |

OTHER PUBLICATIONS

Arda D. Yalcinkaya et al., "Two-Axis Electromagnetic Microscanner for High Resolution Displays", Journal of Microelectromechanical Systems, vol. 15, No. 4, Aug. 2006, pp. 786-794.

Chang-Hyeon Ji et al., "Electromagnetic Two-Dimensional Scanner Using Radial Magnetic Field", Journal of Microelectromechanical Systems, vol. 16, No. 4, Aug. 2007, pp. 989-996.

Wyatt O. Davis et al., "MEMS-Based Pico Projector Display", 2008 IEEE/LEOS International Conference on Optical MEMs and Nanophotonics, Aug. 11-14, 2008, pp. 31-32.

Taiwan Patent Office, Notice of Allowance issued on Jun. 24, 2015.

China Patent Office, Office Action issued on Oct. 20, 2014.

* cited by examiner

OPTICAL SCANNING PROJECTION MODULE

CROSS-REFERENCE TO RELATED APPLICATIONS

This non-provisional application claims priority under 35 U.S.C. §119(a) on Patent Application No. 101101366 filed in Taiwan, R.O.C. on Jan. 13, 2012 and Patent Application No. 101139367 filed in Taiwan, R.O.C. on Oct. 24, 2012, the entire contents of which are hereby incorporated by reference.

BACKGROUND

1. Technical Field

The present disclosure relates to an optical scanning projection module.

2. Related Art

Currently, the micro-projection system technique may be classified into two categories. The first category is a laser scanning projection technique using laser light as a light source, and the second category is a digital light process (DLP) technique or a liquid crystal on silicon (LCoS) technique and uses a Light Emitting Diode (LED) as a light source.

The laser light has a wider color gamut and better color saturation, so the micro-projection system (hereinafter named by the laser scanning projection system) employing a laser as the light source is capable of projecting brighter and more colorful frames. Furthermore, as the laser light has high brightness, good directivity, and may be projected on any plane, the complicated focus lens set is not required when the laser is used as the light source. Accordingly, the structure of the laser scanning projection system can be simplified, and the laser scanning projection system is minimized and may be installed in an electronic device easily.

Since the laser is a high-power light source, it is required for the laser scanning projection system to strictly conform the laser safety standard. Generally, the laser scanning projection system meets the laser safety standard in normal operation. However, when the scanning element (i.e. the micro-mirror) is faulty and cannot control the laser light to form a frame, a single light spot having high brightness is formed and is hazardous to the viewer's eyes. Moreover, the rotation amplitude of the laser scanning projection system associates with the incident light power. During the laser scanning projection system performing the dynamic projection, the content of the frames to be projected changes quickly, so the power of the laser light is changed with the content. Herein, the temperature of the scanning element changes quickly, and so does the rotation amplitude of the scanning element. This causes two adjacent scanned frames cannot be matched. As a result, the image distortion and the frame blur are caused.

SUMMARY

The disclosure relates to an optical scanning projection module including a scanning light component, a main light reflective element, a scanning element and a photosensitive element.

The scanning light component includes a plurality of sub light sources and at least one light-splitting element. Sub light beams of the sub light sources are converged to form a main light beam. One of the sub light beams travels to the at least one light-splitting element to form a partial transmissive light and a partial reflected light. The main light reflective element reflects the main light beam to the scanning element. With a scanning manner, the main light beam is reflected by the scanning element to be a projection light, and one of the partial transmissive light and the partial reflected light is reflected by the scanning element to be an inspection light. The photosensitive element receives the inspection light to output a sensing signal. The optical scanning projection module controls the scanning light component according to the sensing signal.

The disclosure relates to an optical scanning projection module including a scanning light component, an inspection light reflective element, a scanning element and a photosensitive element. With a scanning manner, a main light beam is reflected by the scanning element to be a projection light, and one of a partial transmissive light and a partial reflected light is reflected by the scanning element to be an inspection light. The scanning light component includes a plurality of sub light sources and at least one light-splitting element. Sub light beams of the sub light sources are converged to form the main light beam. One of the sub light beams travels to the at least one light-splitting element to form the partial transmissive light and the partial reflected light. The inspection light reflective element reflects one of the partial transmissive light and the partial reflected light which are from the light-splitting element, to the scanning element. The photosensitive element receives the inspection light to output a sensing signal. The optical scanning projection module controls the scanning light component according to the sensing signal.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

The detailed features and advantages of the disclosure are described below in great detail through the following embodiments, the content of which is sufficient for those of ordinary skill in the art to understand the technical content of the disclosure and to implement the disclosure accordingly. Based upon the content of the specification, the claims, and the drawings, those of ordinary skill in the art can easily understand the relevant objectives and advantages of the disclosure.

Figure 1:
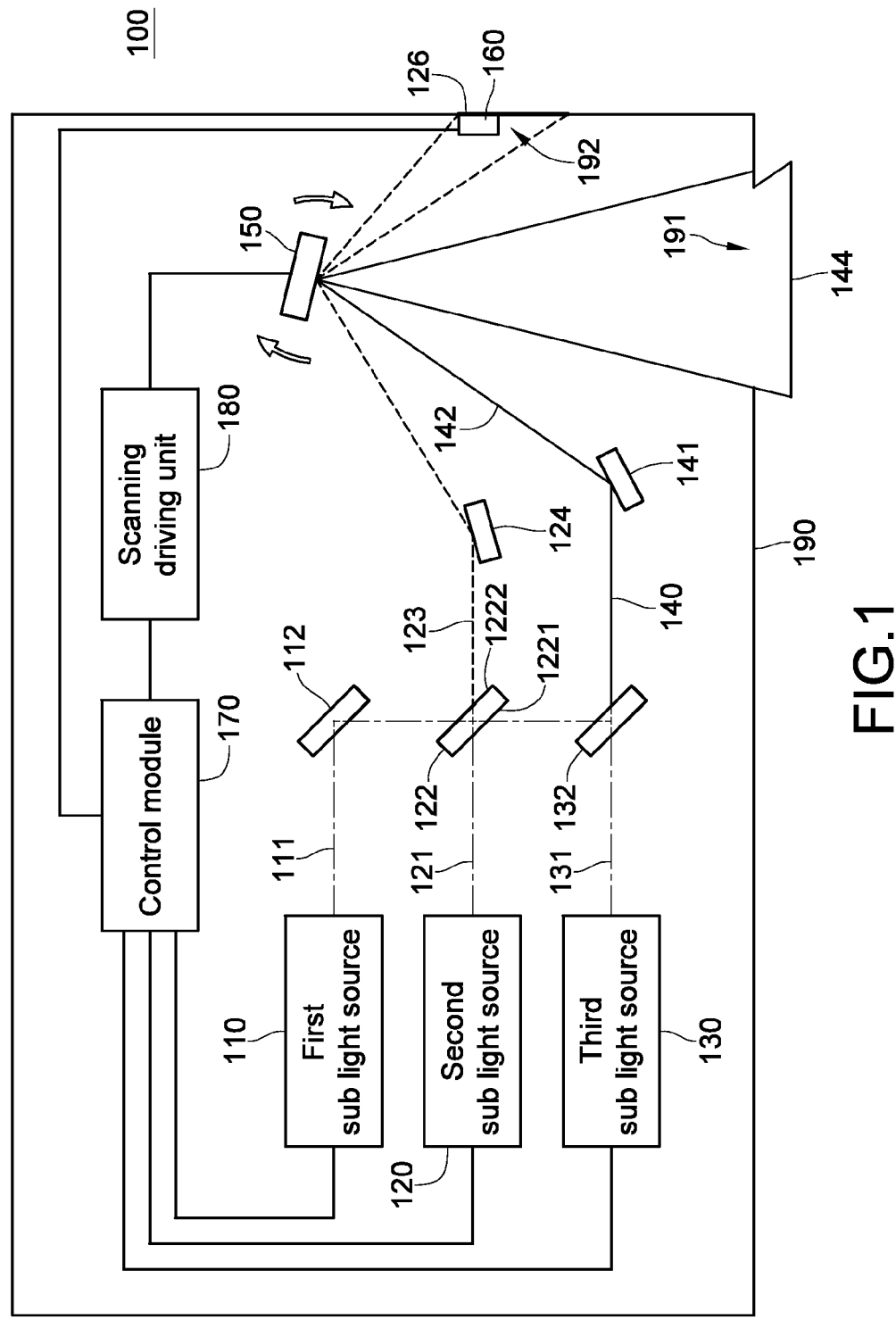
FIG. 1 is a structural diagram of an optical scanning projection module according to one embodiment of the disclosure.

The optical scanning projection module provided by the disclosure can be applied to a mobile projection device, for example, a mobile phone, a PDA or a tablet. FIG. 1 is taken as an example to describe the constitution in the aspect of hardware, and the operation relation in the aspect of software, in the optical scanning projection module of the disclosure.

The optical scanning projection module 100 includes a scanning light component, an inspection light reflective element 124, a main light reflective element 141, a scanning element 150 and a photosensitive element 160. The scanning light component includes a plurality of sub light sources and at least one light-splitting element. It is an example for the description purpose to take a first sub light source 110, a second sub light source 120, a third sub light source 130 and a first light-splitting element 122.

Sub light beams emitted by the sub light sources are converged to form a main light beam 140. The main light reflective element 141 reflects the main light beam 140 to the scanning element 150. One of the sub light beams travels to the first light-splitting element 122 to form a partial transmissive light and a partial reflected light. The inspection light reflective element 124 reflects one of the partial transmissive light and the partial reflected light to the scanning element 150. With a scanning manner, the main light beam 140 is reflected by the scanning element 150 to be a projection light, and one of the partial transmissive light and the partial reflected light is reflected by the scanning element 150 to be an inspection light. The photosensitive element 160 receives the inspection light to output a sensing signal. The optical scanning projection module 100 controls the operation of the scanning light component according to the sensing signal.

Specifically, the optical scanning projection module further includes a control module 170 and a scanning driving unit 180, thereby controlling the operation of the scanning light component according to the sensing signal generated by the photosensitive element 160. The photosensitive element 160 electronically connects to the control module 170. The control module 170 electronically connects to every sub light source and the scanning driving unit 180 respectively. The scanning driving unit 180 electronically connects to the scanning element 150.

Figure 2A:
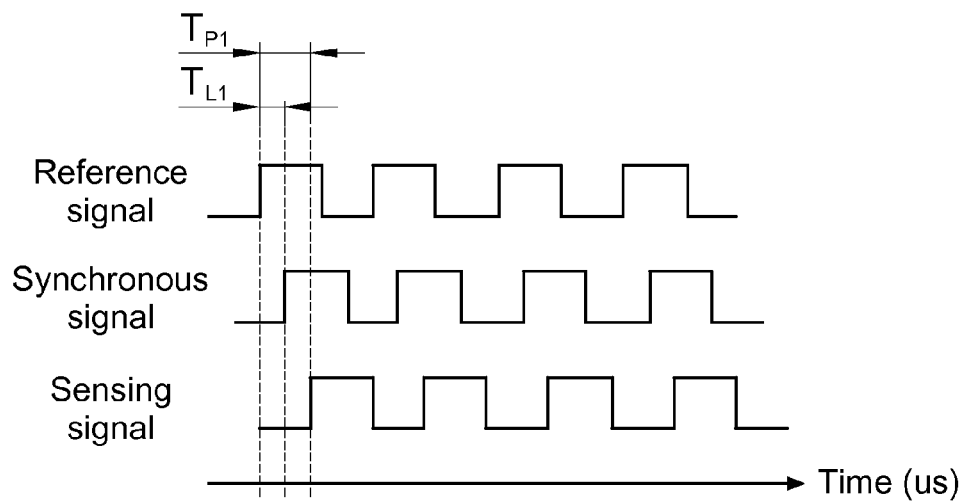
FIG. 2A is a sequence diagram of the signals received by a control module when the scanning element of FIG. 1 operates normally.
Figure 2B:
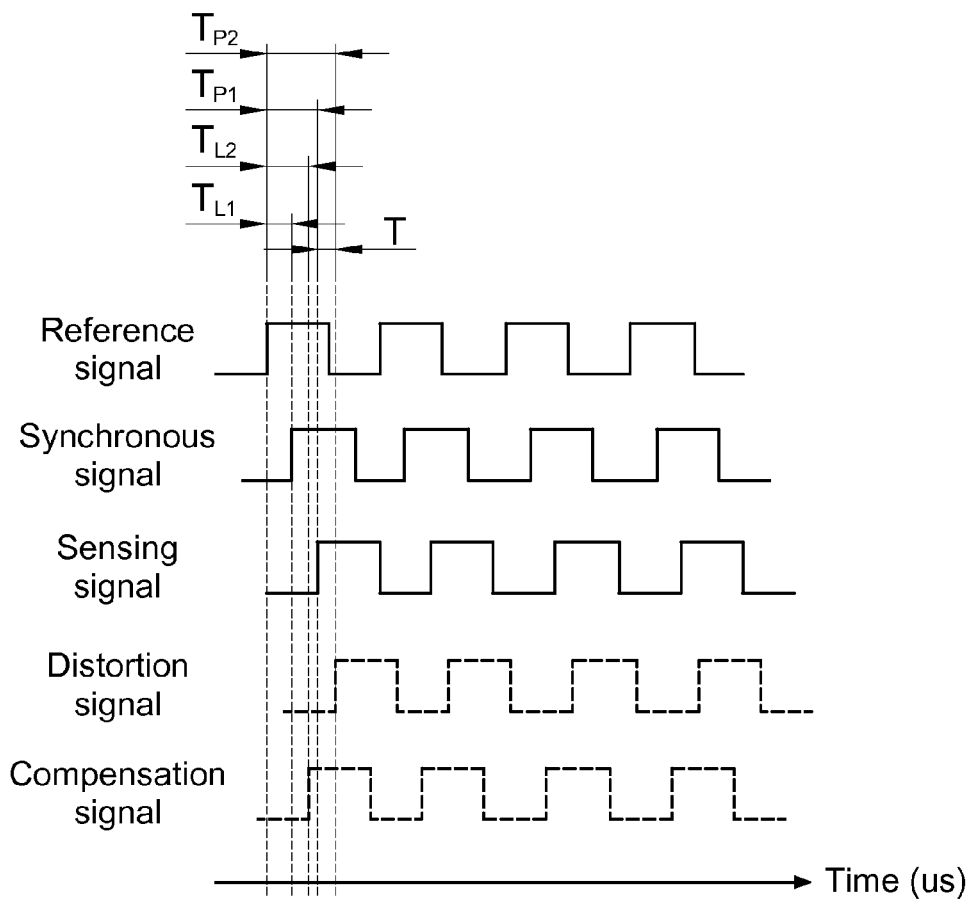
FIG. 2B is a sequence diagram of the signals received by a control module when the scanning element of FIG. 1 operates abnormally.

To describe the control method used by the disclosure, the operation among the photosensitive element 160, the control module 170 and the scanning driving unit 180 in FIG. 1 refers to FIG. 2A and FIG. 2B. The control module 170 controls the scanning driving unit 180 according to a reference signal. The scanning driving unit 180 drives the scanning element 150 according to the reference signal. The control module 170 controls the scanning light component according to a synchronous signal. The control module 170 updates the output time of the synchronous signal according to the time differences among the sensing signal, the previous synchronous signal and the reference signal.

Specifically, the optical scanning projection module 100 has a constant default time difference $T_{L1}$ between the synchronous signal and the reference signal, so that the timing which the partial light beam 123 (the partial transmissive light or the partial reflected light) travels to the scanning element 150, and the operation time of the scanning element 150 are synchronous. Images projected by the optical scanning projection module 100 may be clear. For this purpose, the output time of the synchronous signal is preset, and the setting data is stored in the control module 170. Alternately, the setting data is stored in a memory predeterminedly and then is read out by the control module 170. The optical scanning projection module 100 may provide clear images according to the above setting data under the normal operation thereof. The default time difference $T_{L1}$ is the difference between the rising edge of the synchronous signal and the rising edge of the reference signal.

When the optical scanning projection module 100 operates normally, the control module 170 takes the rising edge of the reference signal as a reference point. Herein, there is a time difference $T_{P1}$ between the rising edge of the sensing signal and the reference point, namely the rising edge of the reference signal, and the default time difference $T_{L1}$ between the rising edge of the synchronous signal and the reference point, namely the rising edge of the reference signal. The difference between the time difference $T_{P1}$ and the default time difference $T_{L1}$ is fixed.

When the optical scanning projection module 100 operates abnormally, the rotation amplitude of the scanning element 150 is over a preset range, and then the scanning path of the scanning element 150 misaligns with a preset scanning path. Herein, the time difference between the distortion signal and the sensing signal which is received by the control module 170 when the optical scanning projection module 100 operates normally, is T microseconds and is equal to the value resulted by subtracting the time difference $T_{P1}$ from the time difference $T_{P2}$. The distortion signal is the sensing signal received by the control module 170 when the projection frame 144 becomes blurred. The time difference $T_{P2}$ is the difference between the rising edge of the distortion signal and the rising edge of the reference signal.

To make the projection frame 144 clear, the control module 170 delays the rising edge of the synchronous signal for T microseconds, namely the value resulted by subtracting time difference $T_{L1}$ from the time difference $T_{L2}$. Herein, the time difference between the compensation signal and the distortion signal is equal to the time difference between the synchronous signal and the sensing signal which are generated when the optical scanning projection module 100 operates normally. Thus, the projection frame 144 may become clear. The rising edge means the position where a low logic level becomes a high logic level. The time difference $T_{L2}$ is the difference between the rising edge of the compensation signal and the rising edge of the reference signal.

However, the foregoing control method performed among the photosensitive element 160, the control module 170 and the scanning driving unit 180 should not limit the disclosure. Besides, in some embodiments, the partial reflected light or the partial transmissive light can directly travel to the scanning element without the inspection light reflective element. The optical scanning projection module of the disclosure is described as below.

FIG. 1 illustrates a structural diagram of an optical scanning projection module according to one embodiment of the disclosure. The optical scanning projection module 100 includes a scanning light component, a main light reflective element 141, an inspection light reflective element 124, a scanning element 150, a photosensitive element 160, a control module 170 and a scanning driving unit 180.

The scanning light component includes a first sub light source 110, a second sub light source 120, a third sub light source 130, a first light-splitting element 122, a second light-splitting element 132 and a sub light reflective element 112. The first sub light source 110 corresponds to the sub light reflective element 112. The second sub light source 120 corresponds to the first light-splitting element 122. The third sub light source 130 corresponds to the second light-splitting element 132.

The sub light beam 111 emitted by the first sub light source 110, the sub light beam 121 emitted by the second sub light source 120, and the sub light beam 131 emitted by the third sub light source 130 are converged through the sub light reflective element 112, the first light-splitting element 122 and the second light-splitting element 132, to form a main light beam 140. The sub light beams 111, 121 and 131 can be any combination of blue light, green light and red light.

The first light-splitting element 122 includes a reflective surface 1221 and a transmissive surface 1222. The reflective surface 1221 allows a light beam having a specific wavelength to pass through partially and reflects the light beam partially. The reflective surface 1221 can be a metal layer or a plating reflective layer. The transmissive surface 1222 allows any light beam to pass through. The transmissive surface 1222 can be made of transparent material.

In one embodiment, the transmittance of the light-splitting element 122, which corresponds to the wavelength of the sub light beam 121, is smaller than the reflectance of the light-splitting element 122. The transmittance can be designed according to the required intensity of the inspection light.

The sub light beam 111, in order, is reflected by the sub light reflective element 112, passes through the first light-splitting element 122, is reflected by the second light-splitting element 132, thereby being converged to form a main light beam 140. When the sub light beam 121 travels to the first light-splitting element 122, five percent of the sub light beam 121 passes through the first light-splitting element 122 to form a partial transmissive light, namely the partial light beam 123. Simultaneously, ninety-five percent of the sub light beam 121 is reflected by the first light-splitting element 122 to form a partial reflected light. Subsequently, the partial reflected light is reflected by the second light-splitting element 132 to be converged to form the main light beam 140. The sub light beam 131 passes through the second light-splitting element 132 to be converged to form the main light beam 140.

In another embodiment, the reflectance of the first light-splitting element 122, which corresponds to the wavelength of the sub light beam 111, is smaller than the transmittance of the first light-splitting element 122. The reflectance can be designed according to the required intensity of the inspection light.

When the sub light beam 111 is reflected by the sub light reflective element 112 to the first light-splitting element 122, five percent of the sub light beam 111 is reflected by the first light-splitting element 122 to form a partial reflected light, namely the partial light bean 123. Simultaneously, ninety-five percent of the sub light beam 111 passes through the first light-splitting element 122 to form a partial transmissive light. The partial transmissive light is reflected by the second light-splitting element 132 to be converged to form the main light beam 140. The sub light beam 121, in order, is reflected by the first light-splitting element 122 and by the second light-splitting element 132 to be converged to form the main light beam 140. The sub light beam 131 passes through the second light-splitting element 132 to be converged to form the main light beam 140.

Subsequently, the main light beam 140 is reflected by the first main light reflective element 141 to be the first reflected light 142. The first reflected light 142 travels to the scanning element 150. The partial light beam 123 (the partial transmissive light or the partial reflected light) from the first light-splitting element 122 is reflected by the inspection light reflective element 124 to be a second reflected light. The second reflected light travels to the scanning element 150. With the scanning manner, the second reflected light and the first reflected light 142 are reflected by the scanning element 150 to be an inspection light and a projection light respectively. The inspection light forms an inspection frame 126 by a dot-to-line manner, and the projection light also forms a projection frame 144 by the dot-to-line manner.

The photosensitive element 160 can be disposed where the inspection frame 126 is projected, thereby receiving the inspection light traveling from the scanning element 150 to output a sensing signal to the control module 170. The control module 170 controls the operation of every sub light source and of the scanning driving unit 180 according to the sensing signal. The control method used by the optical scanning projection module 100 refers to the description in FIG. 2A and FIG. 2B.

Figure 3:
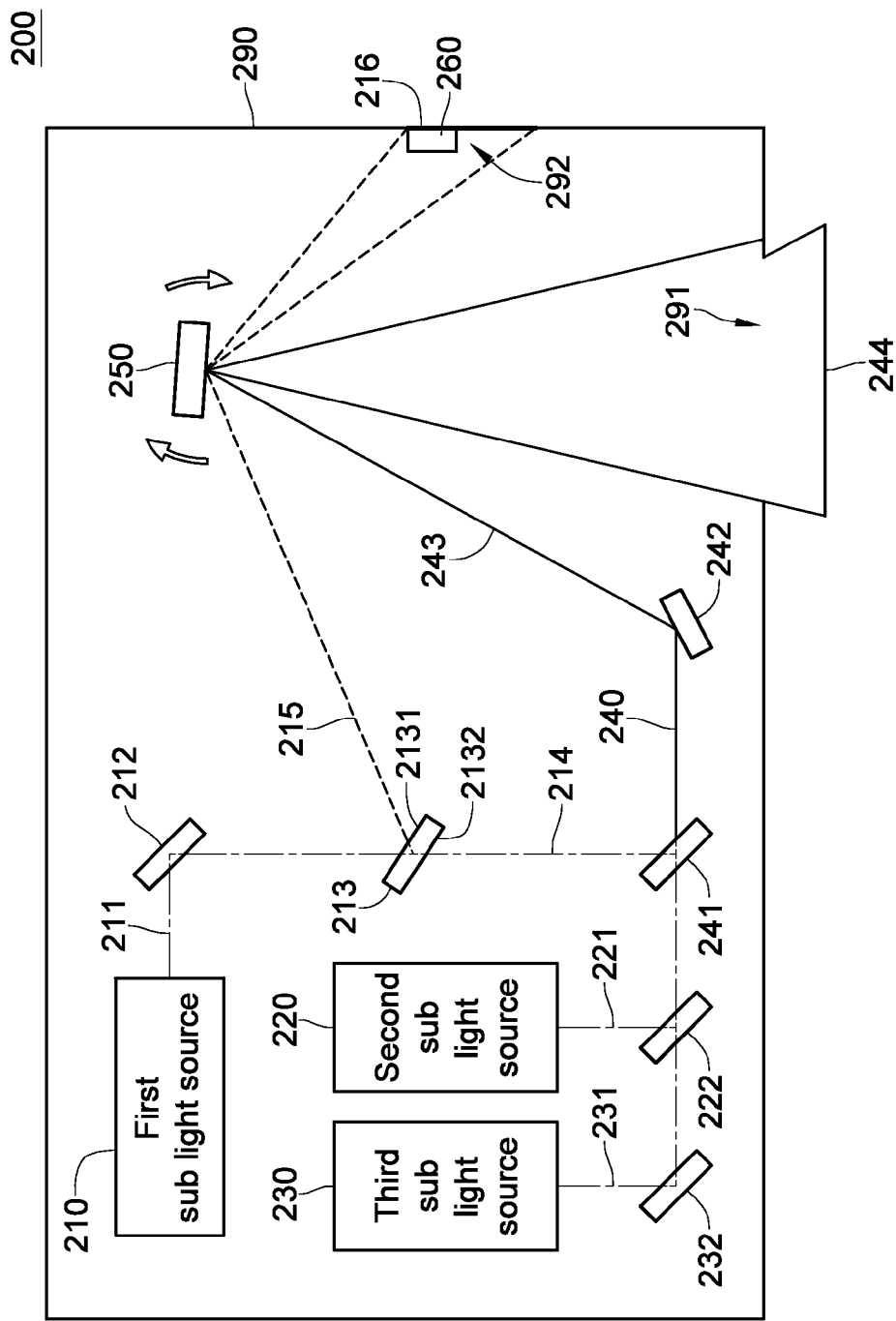
FIG. 3 is a structural diagram of an optical scanning projection module according to one embodiment of the disclosure.

FIG. 3 illustrates a structural diagram of an optical scanning projection module according to one embodiment of the disclosure. The optical scanning projection module 200 includes a scanning light component, a main light reflective element 242, a scanning element 250 and a photosensitive element 260. The scanning light component includes a first sub light source 210, a second sub light source 220, a third sub light source 230, a first light-splitting element 213, a second light-splitting element 222, a third light-splitting element 241, a first sub light reflective element 212 and a second sub light reflective element 232. The first sub light source 210 corresponds to the first sub light reflective element 212 and the first light-splitting element 213. The second sub light source 220 corresponds to the second light-splitting element 222. The third sub light source 230 corresponds to the second sub light reflective element 232.

The sub light beam 211 emitted by the first sub light source 210, the sub light beam 221 emitted by the second sub light source 220, and the sub light beam 231 emitted by the third sub light source 230 are converged through the first sub light reflective element 212, the second sub light reflective element 232, the first light-splitting element 213, the second light-splitting element 222 and the third light-splitting element 241, to form the main light beam 240. The sub light beams 211, 221 and 231 can be any combination of blue light, green light and red light.

The first light-splitting element 213 has a reflective surface 2131 and a transmissive surface 2132. The reflective surface 2131 allows a light beam having a specific wavelength to pass through partially, and reflects the light beam partially. The transmissive surface 2132 allows light beams to pass through. In this embodiment, the reflectance of the first light-splitting element 213, which corresponds to the wavelength of the sub light beam 211, is smaller than the transmittance of the first light-splitting element 213. The percentage of the partial transmissive light can be designed according to the required intensity of the inspection light.

The sub light beam 231, in order, is reflected by the second sub light reflective element 232, and passes through the second light-splitting element 222 and the third light-splitting element 241 to be converged to form a main light beam 240. When the sub light beam 211 is reflected by the first sub light reflective element 212 to the first light-splitting element 213, five percent of the sub light beam 211 is reflected by the first light-splitting element 213 to be a partial reflected light 215. Simultaneously, ninety-five percent of the sub light beam 211 passes through the first light-splitting element 213 to be a partial transmissive light 214. The partial transmissive light 214 is reflected by the third light-splitting element 241 to be converged to form the main light beam 240. The sub light beam 221, in order, is reflected by the second light-splitting element 222 and passes through the third light-splitting element 241, thereby being converged to form the main light beam 240.

Subsequently, the main light beam 240 is reflected by the main light reflective element 242 to be a first reflected light 243. The first reflected light 243 travels to the scanning element 250. The partial reflected light 215 directly travels from the first light-splitting element 213 to the scanning element 250. With the scanning manner, the partial reflected light 215 and the first reflected light 243 are reflected by the scanning element 250 to be an inspection light and a projection light respectively. The inspection light forms an inspection frame 216, and the projection light forms a projection frame 244.

The photosensitive element 260 can be disposed where the inspection frame 216 is, thereby receiving the inspection light traveling from the scanning element 250, to output the sensing signal. The optical scanning projection module 200 controls the operation of the scanning light component and of the scanning element 250 according to the sensing signal. The control method used by the optical scanning projection module 200 refers to the description in FIG. 2A and FIG. 2B.

In this embodiment, the direction which the first sub light source 210 emits the sub light beam 211 is equal to and parallel to the direction which the main light beam 240 travels to the main light reflective element 242.

Figure 4:
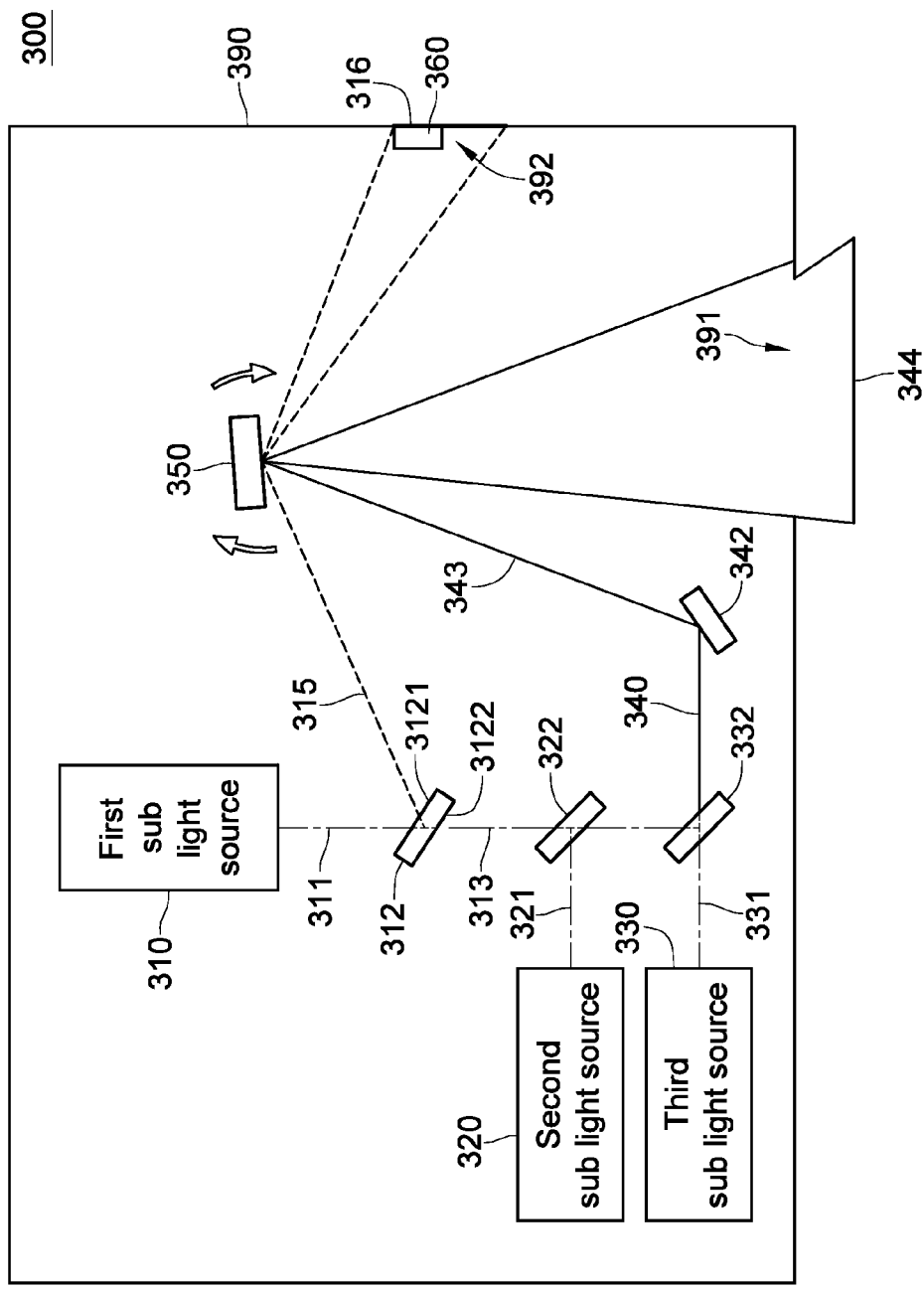
FIG. 4 is a structural diagram of an optical scanning projection module according to one embodiment of the disclosure.

FIG. 4 illustrates a structural diagram of the optical scanning projection module according to one embodiment of the disclosure. The optical scanning projection module 300 includes a scanning light component, a main light reflective element 342, a scanning element 350 and a photosensitive element 360. The scanning light component includes a first sub light source 310, a second sub light source 320, a third sub light source 330, a first light-splitting element 312, a second light-splitting element 322 and a third light-splitting element 332. The first sub light source 310 corresponds to the first light-splitting element 312. The second sub light source 320 corresponds to the second light-splitting element 322. The third sub light source 330 corresponds to the third light-splitting element 332.

The sub light beam 311 emitted by the first sub light source 310, the sub light beam 321 emitted by the second sub light source 320, and the sub light beam 331 emitted by the third sub light source 330 are converged through the first light-splitting element 312, the second light-splitting element 322 and the third light-splitting element 332, to form the main light beam 340. The sub light beams 311, 321 and 331 can be any combination of blue light, green light and red light.

The first light-splitting element 312 has a reflective surface 3121 and a transmissive surface 3122. The reflective surface 3121 allows a light beam having a specific wavelength, to pass through partially and also reflects the light beam partially. The transmissive surface 3122 allows light beams to pass through. In this embodiment, the reflectance of the first light-splitting element 312, which corresponds to the wavelength of the sub light beam 311, is smaller than the transmittance of the first light-splitting element 312. The percentage of the partial transmissive light can be designed according to the required intensity of the inspection light.

When the sub light beam 311 travels to the first light-splitting element 312, five percent of the sub light beam 311 is reflected by the first light-splitting element 312 to be a partial reflected light 315, and ninety-five percent of the sub light beam 311 passes through the first light-splitting element 312 to be a partial transmissive light 313. The partial transmissive light 313, in order, passes through the second light-splitting element 322 and is reflected by the third light-splitting element 332, thereby being converged to form the main light beam 340. The sub light beam 321 is reflected by, in order, the second light-splitting element 322 and the third light-splitting element 332, thereby being converged to form the main light beam 340. The sub light beam 331 passes through the third light-splitting element 332 to be converged to form the main light beam 340.

Subsequently, the main light beam 340 is reflected by the main light reflective element 342 to be a first reflected light 343, and then travels to the scanning element 350. The partial reflected light 315 directly travels from the first light-splitting element 312 to the scanning element 350. With the scanning manner, the partial reflected light 315 is reflected by the scanning element 350 to form an inspection frame 316 on the photosensitive element 360, and the main light beam 340 is reflected by the scanning element 350 to form a projection frame 344 on a screen. The direction which the first sub light source 310 emits the sub light beam 311 is vertical to the direction which the main light beam 340 travels to the main light reflective element 342.

The photosensitive element 360 can be disposed where the inspection frame 316 is, thereby receiving the inspection light from the scanning element 350 to output the sensing signal. The optical scanning projection module 300 controls the operation of the scanning light component and of the scanning element 350 according to the sensing signal. The control method used by the optical scanning projection module 300 refers to the description in FIG. 2A and FIG. 2B.

Figure 5:
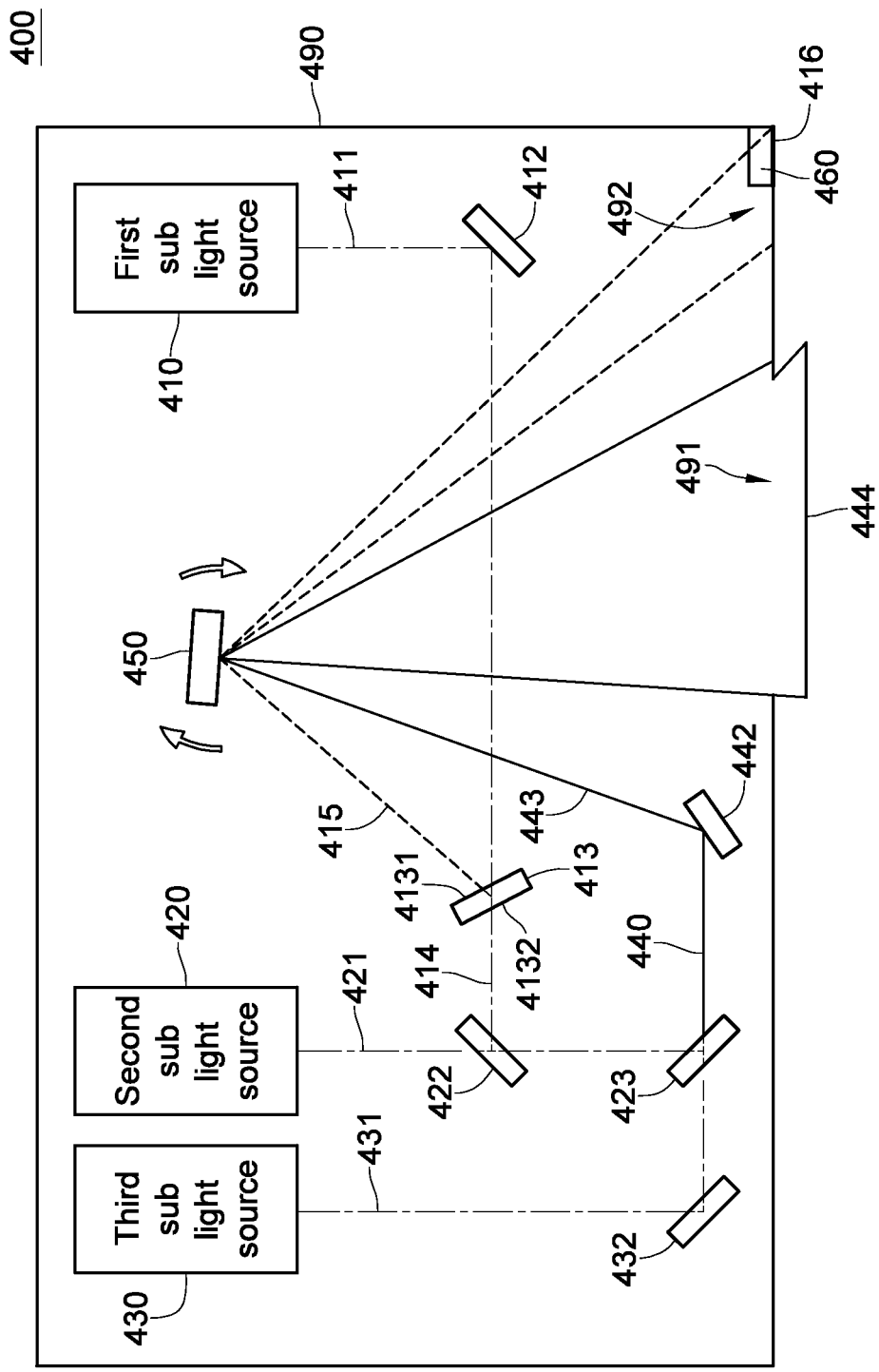
FIG. 5 is a structural diagram of an optical scanning projection module according to one embodiment of the disclosure.

FIG. 5 illustrates a structural diagram of the optical scanning projection module according to one embodiment of the disclosure. As comparing with FIG. 3, the scanning light component in the optical scanning projection module 400 includes a first sub light source 410, a second sub light source 420, a third sub light source 430, a first light-splitting element 413, a second light-splitting element 422, a third light-splitting element 423, a first sub light reflective element 412 and a second reflective element 432. The first sub light source 410 corresponds to the first sub light reflective element 412. The second sub light source 420 corresponds to the second light-splitting element 422. The third sub light source 430 corresponds to the second sub light reflective element 432.

The sub light beam 411 emitted by the first sub light source 410, the sub light beam 421 emitted by the second sub light source 420, and the sub light beam 431 emitted by the third sub light source 430 are converged through the first light-splitting element 413, the second light-splitting element 422, the third light-splitting element 423, the first sub light reflective element 412 and the second sub light reflective element 432, to form the main light beam 440. The sub light beams 411, 421 and 431 can be any combination of blue light, green light and red light.

The first light-splitting element 413 has a reflective surface 4131 and a transmissive surface 4132. The reflective surface 4131 allows a light beam having a specific wavelength, to pass through partially and also reflects the light beam partially. The transmissive surface 4132 allows any light beam to pass through. The reflectance of the first light-splitting element 413, which corresponds to the wavelength of the sub light beam 411, is smaller than the transmittance of the first light-splitting element 413. The reflectance can be designed according to the required intensity of the inspection light.

When the sub light beam 411 is reflected by the first sub light reflective element 412 to the first light-splitting element 413, five percent of the sub light beam 411 is reflected by the first light-splitting element 413 to form a partial reflected light 415, and ninety-five percent of the sub light beam 411 passes through the first light-splitting element 413 to form a partial transmissive light 414. The partial transmissive light 414, in order, is reflected by the second light-splitting element 422 and by the third light-splitting element 423, thereby being converged to form the main light beam 440. The sub light beam 421 passes through the second light-splitting element 422, and then is reflected by the third light-splitting element 423, thereby being converged to form the main light beam 440. The sub light beam 431, in order, is reflected by the second sub light reflective element 432, and passes through the third light-splitting element 423, thereby being converged to form the main light beam 440.

Subsequently, the main light beam 440 is reflected by the main light reflective element 442 to be a first reflected light 443, and then travels to the scanning element 450. The partial reflected light 415 directly travels from the first light-splitting element 413 to the scanning element 450. With the scanning manner, the partial reflected light 415 is reflected by the scanning element 450 to form an inspection frame 416, and the first reflected light 443 is reflected by the scanning element 450 to form a projection frame 444. The direction which the first sub light source 410 emits the sub light beam 411 is vertical with the direction which the main light beam 440 travels to the main light reflective element 442. The sub light beam 411 travels across the path of the projection light and of the inspection light when the sub light beam 411 travels from the first sub light reflective element 412 to the first light-splitting element 413.

The photosensitive element 460 can be disposed where the inspection frame 416 is, so as to receive the inspection light from the scanning element 450 and then output the sensing signal. The optical scanning projection module 400 controls the operations of the scanning light component and the scanning element 450 according to the sensing signal. The control method used by the optical scanning projection module 400 refers to the description in FIG. 2A and FIG. 2B.

Figure 6:
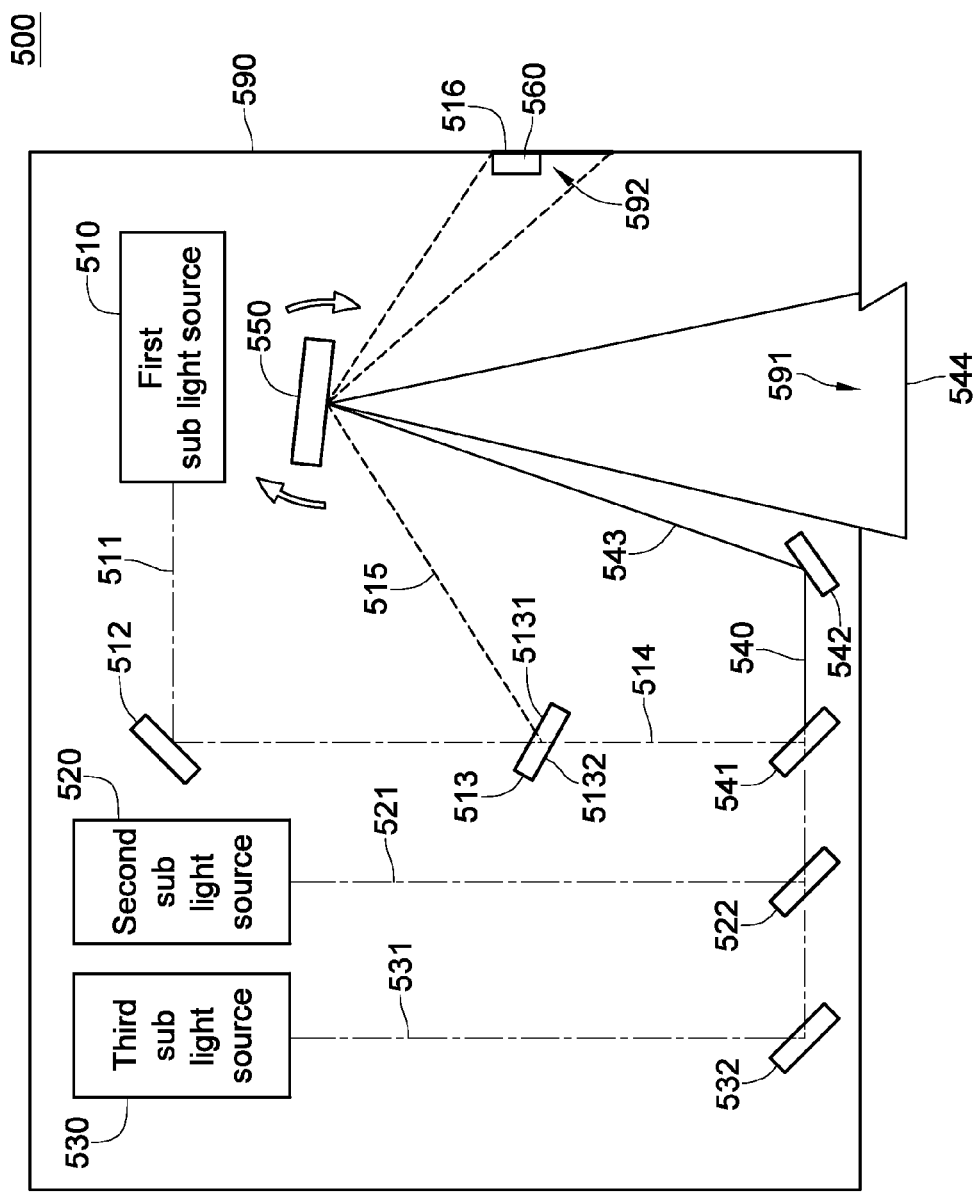
FIG. 6 is a structural diagram of an optical scanning projection module according to one embodiment of the disclosure.

FIG. 6 illustrates a structural diagram of the optical scanning projection module according to one embodiment of the disclosure. As compared with FIG. 5, in the optical scanning projection module 500, the first sub light source 510 corresponds to the first sub light reflective element 512, that the second sub light source 520 corresponds to the second light-splitting element 522, and that the third sub light source 530 corresponds to the second sub light reflective element 532. The sub light beam 511 of the first sub light source 510, the sub light beam 521 of the second sub light source 520, and the sub light beam 531 of the third sub light source 530 are converged through the first sub light reflective element 512, the second sub light reflective element 532, the first light-splitting element 513, the second light-splitting element 522 and the third light-splitting element 541, to form the main light beam 540.

The direction which the first sub light source 510 emits the sub light source 511 is parallel with and opposite to the direction which the main light beam 540 travels to the main light reflective element 542. The sub light beams 511, 521 and 531 can be any combination of blue light, green light and red light.

The first light-splitting element 513 has a reflective surface 5131 and a transmissive surface 5132. The reflective surface 5131 allows a light beam having a specific wavelength to pass through partially, and also reflects the light beam partially. The transmissive surface 5132 allows any light beam to pass through. The reflectance of the first light-splitting element 513, which corresponds to the wavelength of the sub light beam 511, is smaller than the transmittance of the first light-splitting element 513. The reflectance can be designed according to the required intensity of the inspection light.

When the sub light beam 511 is reflected by the first sub light reflective element 512 to the first light-splitting element 513, five percent of the sub light beam 511 is reflected by the first light-splitting element 513 is reflected to form a partial reflected light 515. Simultaneously, ninety-five percent of the sub light beam 511 passes through the first light-splitting element 513 to form a partial transmissive light 514. The partial transmissive light 514 is reflected by the third light-splitting element 541 so as to be converged to form the main light beam 540. The sub light beam 521, in order, is reflected by the second light-splitting element 522 and passes through the third light-splitting element 541, thereby being converged to form the main light beam 540. The sub light beam 531 in order, is reflected by the second sub light reflective element 532 and passes through the second light-splitting element 522 and the third light-splitting element 541, thereby being converged to form the main light beam 540.

Subsequently, the main light beam 540 is reflected by the main light reflective element 542 to be the first reflected light 543, and then is projected on the scanning element 550. The partial reflected light 515 directly travels from the first light-splitting element 513 to the scanning element 550. With the scanning manner, the partial reflected light 515 and the first reflected light 543 are reflected by the scanning element 550 to respectively form an inspection frame 516 and a projection frame 544.

The photosensitive element 560 can be disposed where the inspection frame 516 is, thereby receiving the inspection light from the scanning element 550, to output the sensing signal. The optical scanning projection module 500 controls the operations of the scanning light component and the scanning element 550 according to the sensing signal. The control method used by the optical scanning projection module 500 refers to the corresponding description in FIGS. 2A and 2B.

Figure 7:
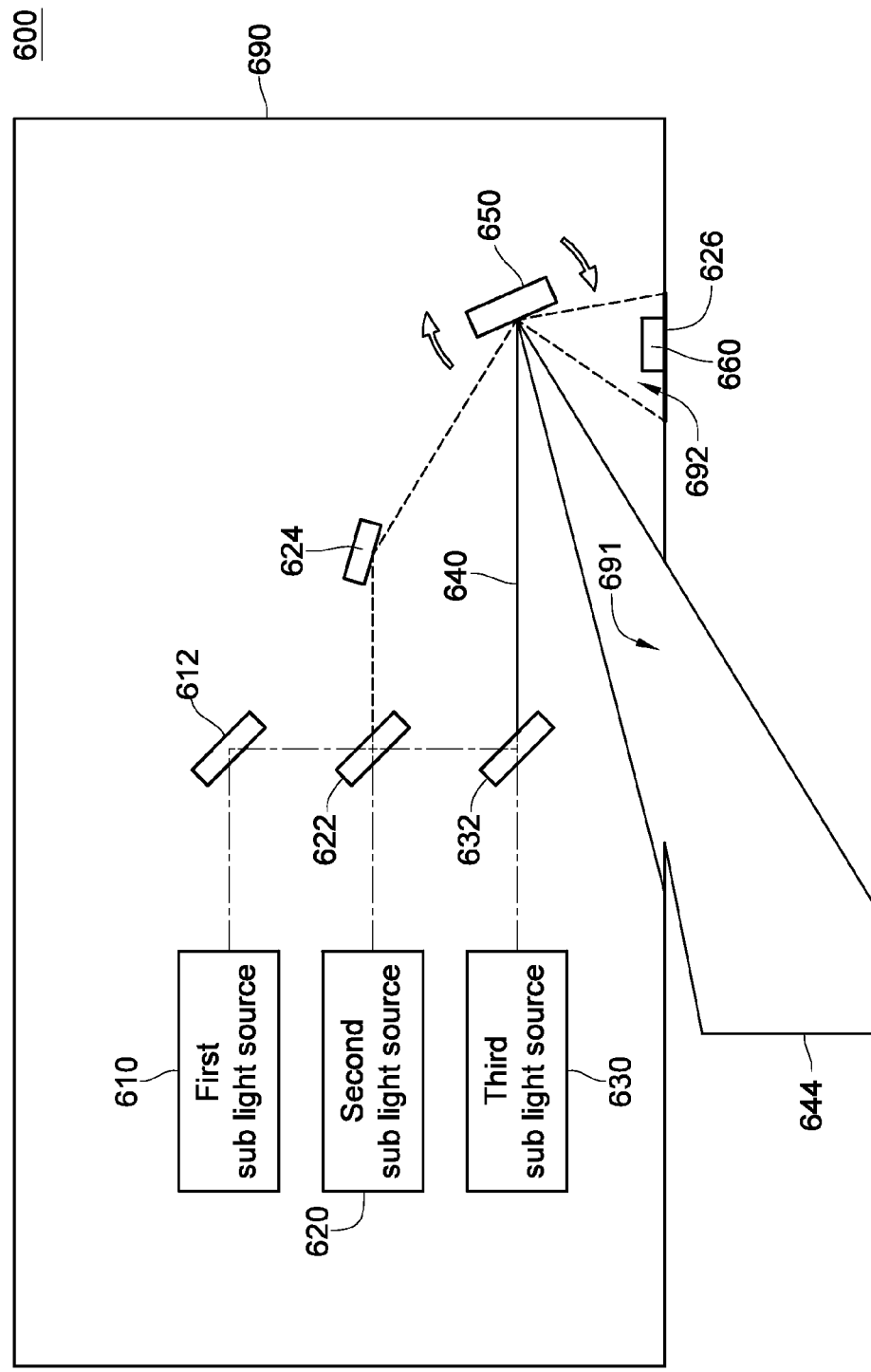
FIG. 7 is a structural diagram of an optical scanning projection module according to one embodiment of the disclosure.

FIG. 7 illustrates a structural diagram of the optical scanning projection module according to one embodiment of the disclosure. The difference between FIG. 1 and FIG. 7 is that it is not necessary for the optical scanning projection module 600 to use any extra reflective element when the main light beam 640 is directly projected by the second light-splitting element 632 to the scanning element 650 so as to form the projection frame 644. In this embodiment, the operation among the first sub light source 610, the second sub light source 620, the third sub light source 630, the sub light reflective element 612, the first light-splitting element 622, the inspection light reflective element 624, the second light-splitting element 632, the scanning element 650 and the photosensitive element 660, the forming of the inspection frame 626, and the control method used by the optical scanning projection module 600 refer to the description in FIG. 1.

In the disclosure, the reflectance or transmittance of the light-splitting element having a reflective surface and a transmissive surface can be designed according to the application request, and should not be limited by the foregoing embodiments. Moreover, the ratio of the reflectance and the transmittance can be designed according to the required intensity of the inspection light. If the partial reflected light serves as the inspection light, the transmittance of the light-splitting element is greater than the reflectance of the light-splitting element. If the partial transmissive light serves as the inspection light, the reflectance of the light-splitting element is greater than the transmittance of the light-splitting element.

In the disclosure, the optical scanning projection module can further include a housing, namely the housings 190, 290, 390, 490, 590 and 690. The housing includes a light exit hole, namely the light exit hole 191, 291, 391, 491, 591 or 691, and an inspection area, namely the inspection area 192, 292, 392, 492, 592 or 692. The position of the inspection area is inside the housing, is a suitable distance away from the light exit hole, and corresponds to the position of the photosensitive element. The distance between the inspection area and the light exit hole can be designed according to the application request. Moreover, the inspection light is blocked by the housing so that the inspection light can not be projected out of the light exit hole. The projection light passes through the light exit hole and is projected to a screen outside the optical scanning projection module to form the projection frame. The detail of the projection frame is described as follows.

Figure 8:
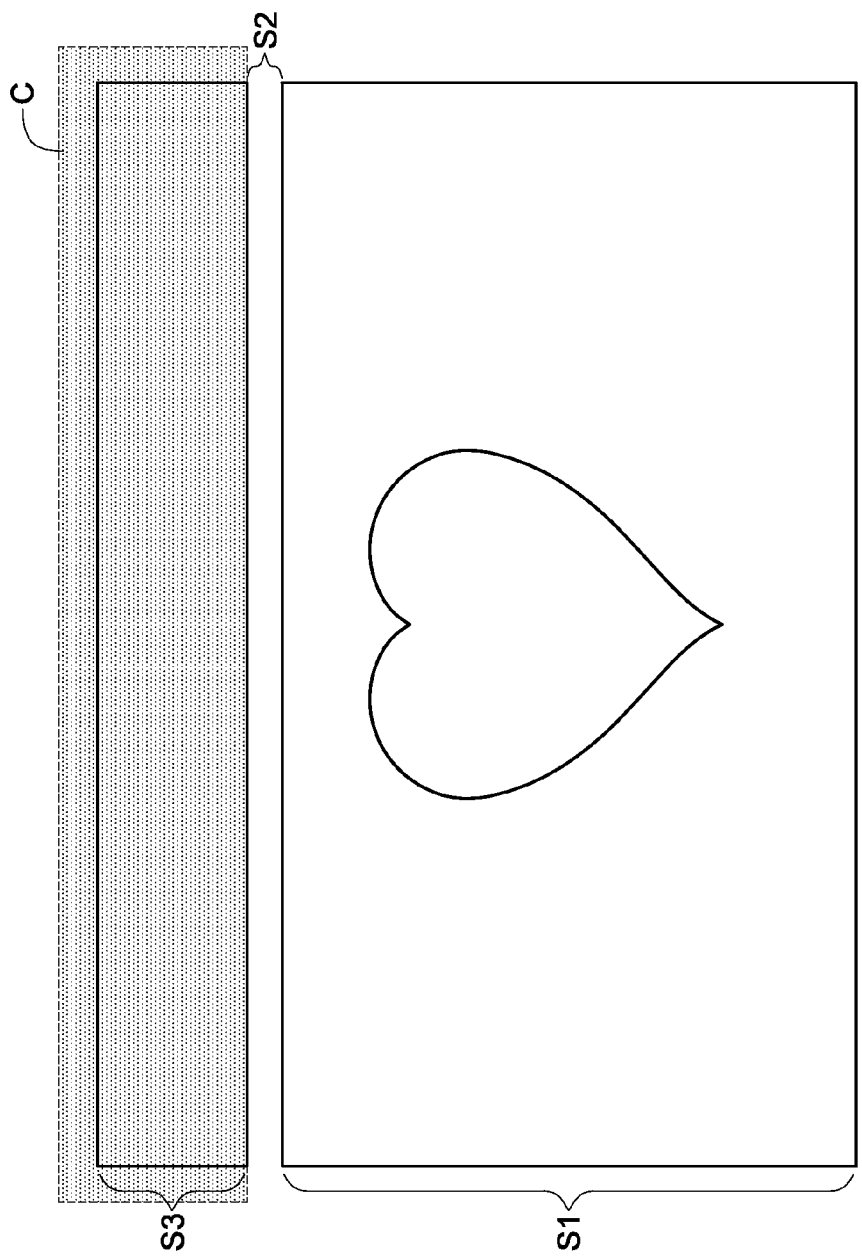
FIG. 8 is a schematic diagram of the projection frame formed by the optical scanning projection module of the disclosure.

In some embodiments as shown in FIG. 8, when the projection light from the scanning element forms an image frame 743 having a resolution of, for example, 1280*740 dpi, the image frame 743 has a first frame zone S1, a blank zone S2 and a second frame zone S3 in accordance with the operation of the scanning element.

The image having the spectrum of the main light beam is displayed in the first frame zone S1 of the image frame 743, and is projected out of the light exit hole to be projected on a screen to form the projection frame. The first frame zone S1 has a resolution of, for example, 1280*720 dpi. When the scanning element is performing the scanning projection and when all the sub light sources are forced to provide light having the lowest brightness or are turned off, the above image is not displayed in the blank zone S2 so as to avoid the diffraction. The blank zone S2 has the resolution of, for example, 1280*10 dpi. The projection light projected in the second frame zone S3 is blocked by the housing C around the light exit hole to be not projected out of the light exit hole. The second frame zone S3 has the resolution of, for example, 1280*10 dpi.

The scanning element can rotate vertically and vertically, so that the inspection frame includes a horizontal inspection line. The light intensity of the horizontal inspection line can be changed with time or not. Moreover, the inspection frame further includes a vertical inspection line. The light intensity of the vertical inspection line can be changed with time or not.

Figure 9:
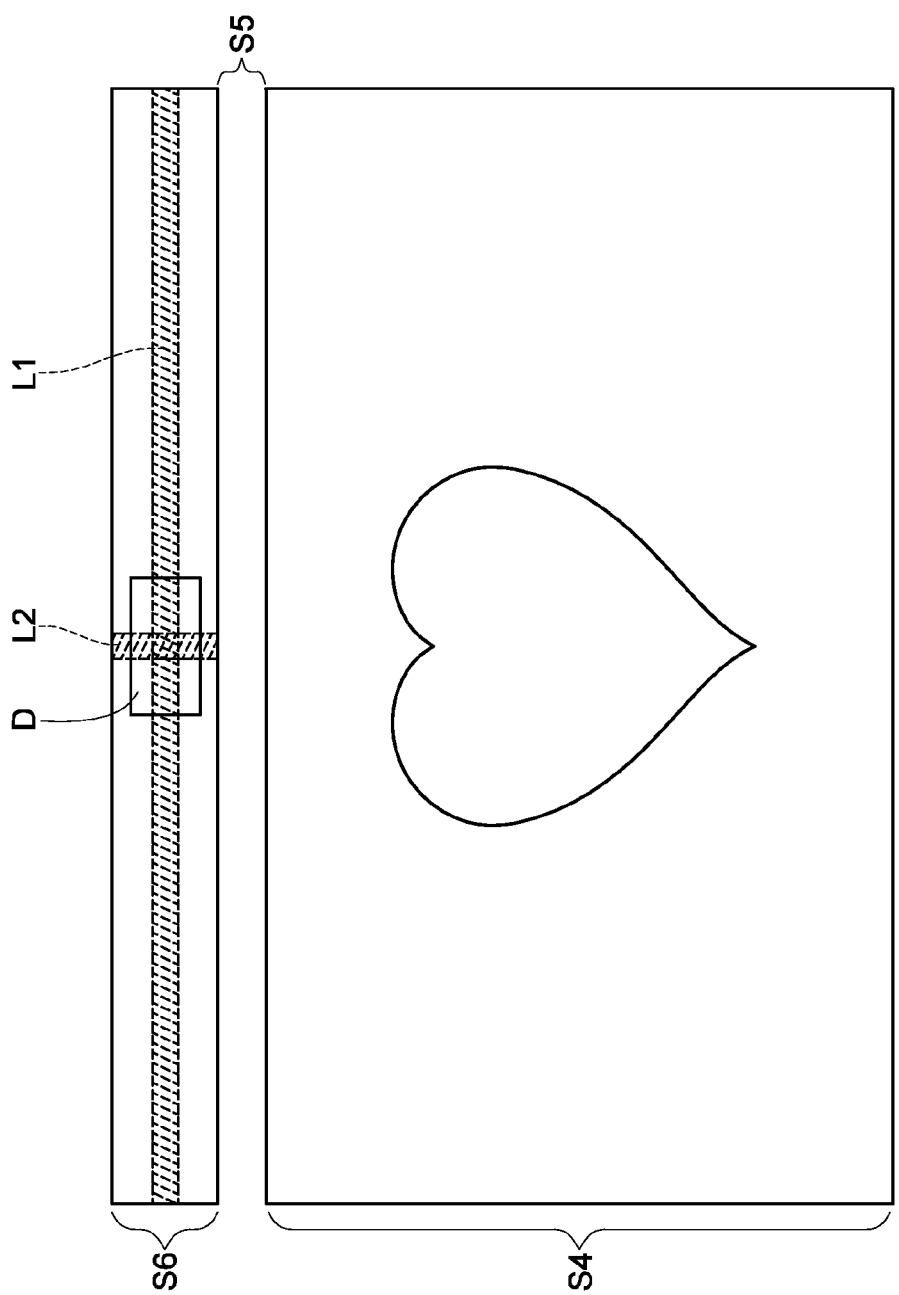
FIG. 9 is a schematic diagram of the inspection frame formed by the optical scanning projection module of the disclosure.

Referring to FIG. 9, when the projection light from the scanning element forms an image frame having a resolution of 1280*740 dpi, the inspection light from the scanning element also forms an image frame 726 (inspection frame) having a resolution of 1280*740 dpi, in the inspection area. The image frame 726 includes a first frame zone S4, a blank zone S5 and a second frame zone S6 in accordance with the operation of the scanning element.

The first frame zone S4 displays an image which has a single color and is also the same as that in the first frame zone S1 of FIG. 8. The first frame zone S4 has a resolution of 1280*720 dpi. When the scanning element is performing the scanning projection and when all the sub light sources are forced to provide light having the lowest brightness or are turned off, the above image is not displayed in the blank zone S5. The blank zone S5 has, for example, a resolution of 1280*10 dpi. The second frame zone S6 displays at least one inspection line, for example, the horizontal inspection line L1 and the vertical inspection line L2. The second frame zone S6 has, for example, a resolution of 1280*10 dpi.

The photosensitive element D is disposed, for example, where the horizontal inspection line L1 crosses the vertical inspection line L2, thereby sensing the horizontal inspection line L1 and the vertical inspection line L2 projected therein. The inspection area is inside the housing so that the image frame 726 is not projected on the screen.

Figure 10:
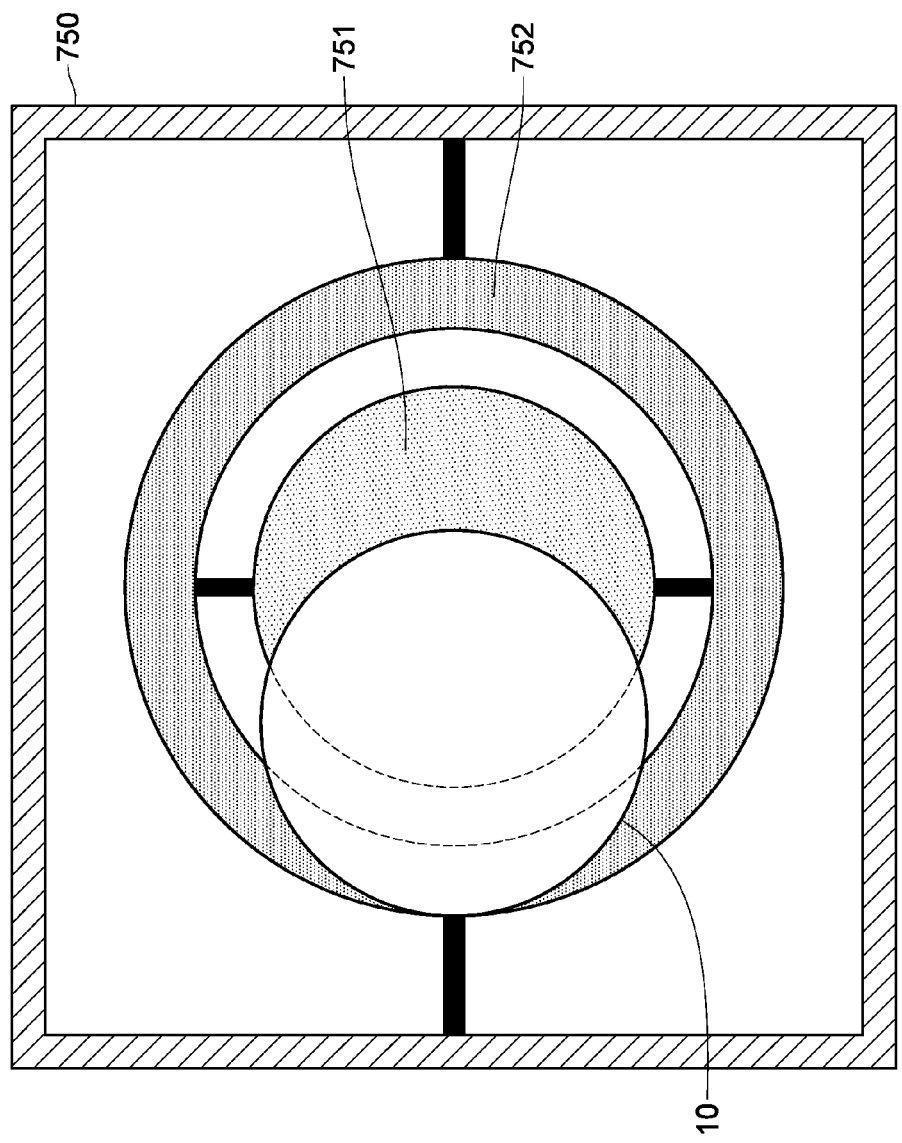
FIG. 10 is a schematic diagram of the scanning element, which the partial reflected light or the partial transmissive light is projected on, of the disclosure.

In the disclosure, the position which the partial light beam (the partial reflected light or the partial transmissive light) serving as the inspection light is projected on the scanning element 750, can be designed according to the application request as shown in FIG. 10. For example, the light spot 10 which is formed by the partial light beam projected on the scanning element 750 deviates the core of the mirror 751, namely located between the mirror 751 and the outer ring 752. The light spot 10 covers the mirror 751 partially and covers the outer ring 752 partially. The partial light beam projected on the outer ring 752 forms the vertical inspection line L2 in the second frame zone S6 in accordance with the vertical scanning of the scanning element 750. The partial light beam projected on the mirror 751 forms the horizontal inspection line L1 in the second frame zone S6 in accordance with the horizontal scanning of the scanning element 750. When the scanning element 750 operates normally, the main light beam (140 to 640) is projected on the mirror 751.

The scanning element is, for example, a galvanometer scanner or a polygon mirror rotated by a motor. The photosensitive element is, for example, a photodetector (PD). The variation of the rotation amplitude of the scanning element associates with a driving power used to drive the scanning element. When the scanning element operates normally, the rotation amplitude of the scanning element is maintained in a preset range. The preset range can be, for example, ±90 degree.

In the disclosure, the first sub light source, the second sub light source and the third sub light source can be, for example, semiconductor lasers. In other word, the first sub light source, the second sub light source and the third sub light source can be solid state lasers. Moreover, the sub light beams of the first sub light source, the second light source and the third light source can respectively have a wavelength or a color, and be arranged according to the application request.

In this disclosure, two of the first sub light source, the second sub light source and the third sub light source can be packaged in a package element, and the scanning light component includes a prism as the light-splitting element.

For example, two dies emitting blue light and green light respectively are packaged in a package element. When the blue light and green light emitted by the package element pass through the light-splitting element, five percent of the blue light is reflected, and the green light and ninety-five percent of the blue light pass through the light-splitting element. Simultaneously, the light-splitting element also reflects red light. The reflected five percent of the blue light serves as the inspection light. The green light, ninety-five percent of the blue light, and the reflected red light are converged to form the main light beam having red light, green light and blue light. The percentage of the partial blue light serving as the inspection light should not limit the scope of the disclosure.

Through the light-splitting element, the disclosure can form an inspection frame inside the optical scanning projection module. The sub light beam of the sub light source passes through the light-splitting element to form a partial reflected light and a partial transmissive light. The partial reflected light or the partial transmissive light travels to the scanning element to form the inspection frame.

In response to the sensing result provided by the photosensitive element disposed at which the inspection frame is at, the disclosure can control the operation of the scanning light component in real time. Thus, the projected image may not become a single light spot which hurts viewer's eyes, when the scanning element is broken down.

In accordance with the characteristic, which the light intensity of the inspection line is not changed with time, and with the disposing of the photosensitive element, the disclosure may accurately output the corresponding sensing signal through the photosensitive element.

Through controlling the position on the scanning element, where the partial reflected light or the partial transmissive light is projected, the disclosure provides an inspection frame includes at least one of the horizontal inspection line and the vertical inspection line. Through the horizontal inspection line and/or the vertical inspection line, the disclosure can inspect the projection stats in the horizontal direction and/or in the vertical direction.

Through the time differences among the previous synchronous signal, the reference signal and the sensing signal, the disclosure updates the output time of the current synchronous signal, so as to compensate the blurred projection frame caused by the variation of the rotation amplitude of the scanning element.

Accordingly, the optical scanning projection module of the disclosure may detect and correct the distortion and have high security in usage.

The disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical scanning projection module, comprising:
    a scanning light component, comprising a plurality of sub light sources and at least one light-splitting element, wherein sub light beams of the sub light sources are converged to form a main light beam, and one of the sub light beams travels to the at least one light-splitting element to form a partial transmissive light and a partial reflected light;
    a main light reflective element, for reflecting the main light beam;
    a scanning element, wherein the main light beam, which travels from the main light reflective element, is reflected by the scanning element with a scanning manner to be a projection light, and one of the partial transmissive light and the partial reflected light is reflected by the scanning element with the scanning manner to be an inspection light; and
    a photosensitive element, for receiving the inspection light to output a sensing signal;
    wherein the optical scanning projection module controls the scanning light component in accordance with the sensing signal.

2. The optical scanning projection module according to claim 1, wherein the optical scanning projection module further comprises an inspection light reflective element, the sub light sources comprises a first sub light source, a second sub light source and a third sub light source, the scanning light component further comprises a sub light reflective element corresponding to the first sub light source, the at least one light-splitting element comprises a first light-splitting element corresponding to the second sub light source, and a second light-splitting element corresponding to the third sub light source, the sub light beam of one of the first sub light source and the second sub light source travels to the first light-splitting element to form the partial transmissive light and the partial reflected light, the inspection light reflective element reflects one of the partial transmissive light and the partial reflected light to the scanning element, and the sub light beams of the first sub light source, the second sub light source and the third sub light source are converged through the first light-splitting element, the second light-splitting element and the sub light reflective element, to form the main light beam.

3. The optical scanning projection module according to claim 2, wherein the sub light beam of the first sub light source is reflected by the sub light reflective element to the first light-splitting element, the sub light beam of the second sub light source or the sub light beam of the first sub light source, which is from the sub light reflective element, is reflected by the first light-splitting element to the second light-splitting element, and then is reflected by the second light-splitting element to be converged to form the main light beam, and the sub light beam of the third sub light source passes through the second light-splitting element to be converged to form the main light beam.

4. The optical scanning projection module according to claim 3, wherein the reflectance of the first light-splitting element, which corresponds to the sub light beam of the second sub light source, is greater than the transmittance of the first light-splitting element.

5. The optical scanning projection module according to claim 3, wherein the reflectance of the first light-splitting element, which corresponds to the sub light beam of the first sub light source, is smaller than the transmittance of the first light-splitting element.

6. The optical scanning projection module according to claim 1, wherein the sub light sources comprise a first sub light source, a second sub light source and a third sub light source;
    the at least one light-splitting element comprises:
        a first light-splitting element, corresponding to the first sub light source;
        a second light-splitting element, corresponding to the second sub light source; and
        a third light-splitting element;
    the scanning light component further comprises:
        a first sub light reflective element, corresponding to the first sub light source, wherein the sub light beam of the first sub light source travels to the first sub light reflective element and the first light-splitting element to form the partial transmissive light and the partial reflected light; and
        a second sub light reflective element, corresponding to the third sub light source;
    wherein the sub light beam of the second sub light source, the sub light beam of the third sub light source, and the partial transmissive light from the first light-splitting element, are converged through the second sub light reflective element, the second light-splitting element and the third light-splitting element, to form the main light beam.

7. The optical scanning projection module according to claim 6, wherein the sub light beam of the first sub light source, in order, is reflected by the first sub light reflective element, passes through the first light-splitting element, and is reflected by the third light-splitting element, so as to be covered to form the main light beam, the sub light beam of the second sub light source, in order, is reflected by the second light-splitting element, and passes throught the third light-splitting element, so as to be converged to form the main light beam, and the sub light beam of the third sub light source, in order, is reflected by the second sub light reflective element, passes through the second light-splitting element, and passes through the third light-splitting element, so as to be converged to form the main light beam.

8. The optical scanning projection module according to claim 7, wherein a direction which the first sub light source emits the sub light beam of the first sub light source is equal to a direction which the main light beam travels to the main light reflective element.

9. The optical scanning projection module according to claim 7, wherein a direction which the first sub light source emits the sub light beam of the first sub light source is opposite to a direction which the main light beam travels to the main light reflective element.

10. The optical scanning projection module according to claim 6, wherein the partial transmissive light, in order, is reflected by the second light-splitting element and by the third light-splitting element to be converged to form the main light beam, the sub light beam of the second sub light source, in order, passes through the second light-splitting element and is reflected by the third light-splitting element, so as to be converged to form the main light beam, and the sub light beam of the third sub light source, in order, is reflected by the second sub light reflective element and passes through the third light-splitting element, so as to be converged to form the main light beam.

11. The optical scanning projection module according to claim 10, wherein the sub light beam of the first sub light source travels across the projection light and the inspection light to travel to the first light-splitting element.

12. The optical scanning projection module according to claim 6, wherein the reflectance of the first light-splitting element, which corresponds to the sub light beam of the first sub light source, is smaller than the transmittance of the first light-splitting element.

13. The optical scanning projection module according to claim 1, wherein the sub light sources comprise a first sub light source, a second sub light source and a third sub light source, the at least one light-splitting element comprises:
a first light-splitting element, corresponding to the first sub light source, wherein the sub light beam of the first sub light source travels to the first light-splitting element to form the partial transmissive light and the partial reflected light;
a second light-splitting element, corresponding to the second sub light source; and
a third light-splitting element, corresponding to the third sub light source;
wherein the partial transmissive light, the sub light beams of the second sub light source and the third sub light source are converged through the second light-splitting element and the third light-splitting element, to form the main light beam.

14. The optical scanning projection module according to claim 13, wherein the reflectance of the first light-splitting element, which corresponds to the sub light beam of the first sub light source, is smaller than the transmittance of the first light-splitting element.

15. The optical scanning projection module according to claim 13, wherein the partial transmissive light, in order, passes through the second light-splitting element and is reflected by the third light-splitting element, so as to be converged to form the main light beam, the sub light beam of the second sub light source, in order, is reflected by the second light-splitting element and by the third light-splitting element to be converged to form the main light beam, and the sub light beam of the third sub light source passes through the third light-splitting element to be converged to form the main light beam.

16. The optical scanning projection module according to claim 1, wherein the inspection light forms an inspection frame, the inspection frame comprises a horizontal inspection line, and the position of the photosensitive element corresponds to the horizontal inspection line.

17. The optical scanning projection module according to claim 16, wherein the inspection frame further comprises a vertical inspection line, the vertical inspection line crosses the horizontal inspection line where the photosensitive element is.

18. The optical scanning projection module according to claim 1, further comprising a housing, the inspection light forms an inspection frame, the inspection frame is blocked by the housing, and the inspection frame comprises:
a first frame zone, for displaying an image data provided by one of the partial transmissive light and the partial reflected light reflected by the scanning element;
a second frame zone, for displaying at least one inspection line; and
a blank zone between the first frame zone and the second frame zone.

19. The optical scanning projection module according to claim 1, further comprising a housing, the projection light forms an image frame, the image frame formed by the projection light comprises:
a first frame zone, for displaying an image data provided by the main light beam;
a second frame zone, blocked by the housing, for displaying a part of the projection light; and
a blank zone between the first frame zone and the second frame zone.

20. The optical scanning projection module according to claim 1, wherein the scanning element comprises a mirror and a outer ring, the outer ring is around the mirror, one of the partial reflected light and the partial transmissive light is projected on the scanning element and forms a light spot, the light spot covers the mirror partially and also covers the outer ring partially.

21. An optical scanning projection module, comprising:
a scanning element, wherein a main light beam is reflected by the scanning element with a scanning manner to be a projection light, and one of a partial transmissive light and a partial reflected light is reflected by the scanning element with the scanning manner to be an inspection light;
a scanning light component, comprising a plurality of sub light sources and at least one light-splitting element, wherein sub light beams of the sub light sources are converged to form the main light beam, one of the sub light beams travels to the light-splitting element to form the partial transmissive light and the partial reflected light;
an inspection light reflective element, for reflecting the one of the partial transmissive light and the partial reflected light which are from the light-splitting element, to the scanning element; and
a photosensitive element, for receiving the inspection light and outputting a sensing signal, wherein the optical scanning projection module controls the scanning light component according to the sensing signal.

22. The optical scanning projection module according to claim 21, wherein the sub light sources comprise a first sub light source, a second sub light source and a third sub light source, the scanning light component further comprises a sub light reflective element, corresponding to the first sub light source, and the at least one light-splitting element comprises:
   a first light-splitting element, corresponding to the second sub light source, wherein the sub light beam of one of the first sub light source and the second sub light source travels to the first light-splitting element to form the partial transmissive light and the partial reflected light; and
   a second light-splitting element, corresponding to the third sub light source;
   wherein the sub light beams of the first sub light source, the second sub light source and the third sub light source are converged through the first light-splitting element, the second light-splitting element and the sub light reflective element, to form the main light beam.

23. The optical scanning projection module according to claim 22, wherein the sub light beam of the first sub light source is reflected by the sub light reflective element to the first light-splitting element, the sub light beam of the second sub light source or the sub light beam of the first sub light source, which is from the sub light reflective element, travels to the second light-splitting element through the first light-splitting element, and then is reflected by the second light-splitting element so as to be converged to form the main light beam, and the sub light beam of the third sub light source passes through the second light-splitting element to be converged to form the main light beam.

24. The optical scanning projection module according to claim 22, wherein the reflectance of the first light-splitting element, which corresponds to the sub light beam of the second sub light source, is greater than the transmittance of the first light-splitting element.

25. The optical scanning projection module according to claim 22, wherein the reflectance of the first light-splitting element, which corresponds to the sub light beam of the first sub light source, is smaller than the transmittance of the first light-splitting element.

26. The optical scanning projection module according to claim 21, wherein the inspection light forms an inspection frame, the inspection frame comprises a horizontal inspection line, and the position of the photosensitive element corresponds to the position the horizontal inspection line.

27. The optical scanning projection module according to claim 26, wherein the inspection frame further comprises a vertical inspection line, the vertical inspection line crosses the horizontal inspection line where the photosensitive element is.

28. The optical scanning projection module according to claim 21, further comprising a housing, the inspection light forms an inspection frame, the inspection frame is blacked by the housing, and the inspection frame comprises:
   a first frame zone, for displaying an image data provided by one of the partial transmissive light and the partial reflected light which are from the scanning element;
   a second frame zone, for displaying at least one inspection line therein; and
   a blank zone between the first frame zone and the second frame zone.

29. The optical scanning projection module according to claim 21, further comprising a housing, the projection light forms an image frame, the image frame of the projection light comprises:
   a first frame zone, for displaying an image data provided by the main light beam;
   a second frame zone, blocked by the housing, for allowing a part of the projection light to be projected therein; and
   a blank zone between the first frame zone and the second frame zone.

30. The optical scanning projection module according to claim 21, wherein the scanning element comprises a mirror and a outer ring, the outer ring is around the mirror, one of the partial reflected light and the partial transmissive light is projected on the scanning element to form a light spot, the light spot covers the mirror partially and also covers the outer ring partially.

* * * * *